United States Patent [19]

Neufeldt

[11] 4,256,035

[45] Mar. 17, 1981

[54] REFUSE COMPACTING DEVICE

[76] Inventor: Jacob J. Neufeldt, c/o Neufeldt Industries, Inc., P. O. Box 597, Lethbridge, Alberta, Canada, T1J 3Z4

[21] Appl. No.: 596

[22] Filed: Jan. 2, 1979

[51] Int. Cl.³ .............................................. B30B 3/00
[52] U.S. Cl. ................................... 100/145; 100/149; 366/156
[58] Field of Search ......... 100/145, 149, 117, DIG. 3; 425/208; 366/331, 310, 156, 186

[56] References Cited

U.S. PATENT DOCUMENTS

| 2,930,314 | 3/1960 | Carlson | 100/147 |
| 3,120,948 | 2/1964 | Stratienko | 366/331 |
| 3,222,853 | 12/1965 | Michael | 100/145 X |
| 3,991,668 | 11/1976 | DeMilt et al. | 100/98 R |

FOREIGN PATENT DOCUMENTS

| 665161 | 6/1963 | Canada . |
| 667760 | 7/1963 | Canada . |
| 730515 | 3/1966 | Canada . |
| 763208 | 7/1967 | Canada . |
| 909075 | 9/1972 | Canada . |
| 948583 | 6/1974 | Canada . |

Primary Examiner—Leonard D. Christian

[57] ABSTRACT

The specification describes a refuse compacting device of the auger type including a housing having a hopper section at one end for receiving refuse material to be compacted and a compaction section at the other end for compacting refuse received from the hopper section into a densified plug, a rotatable auger screw extending through the hopper section and partly into the compaction section wherein the auger screw is resiliently mounted in the housing for limited angular movement in all directions from its normal axis of rotation so as to permit processing of materials which cannot otherwise be processed and to reduce the possibility of blockages.

35 Claims, 10 Drawing Figures

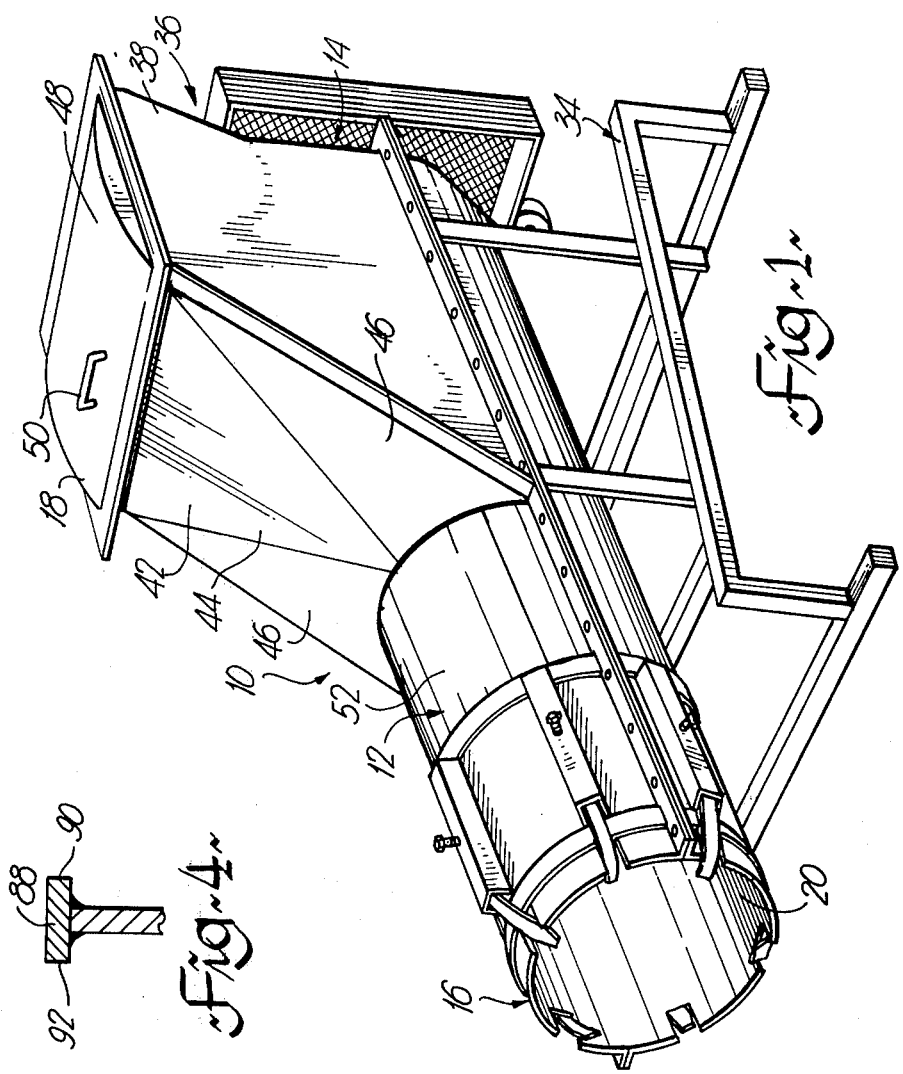
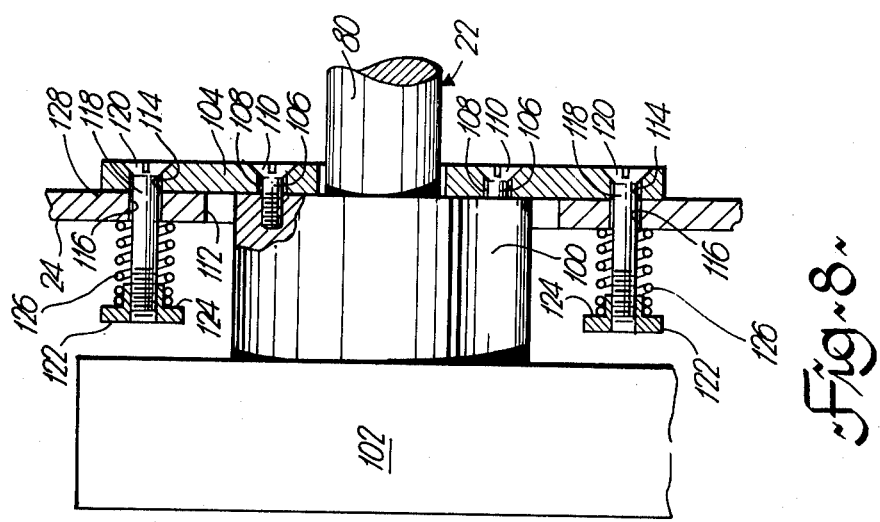

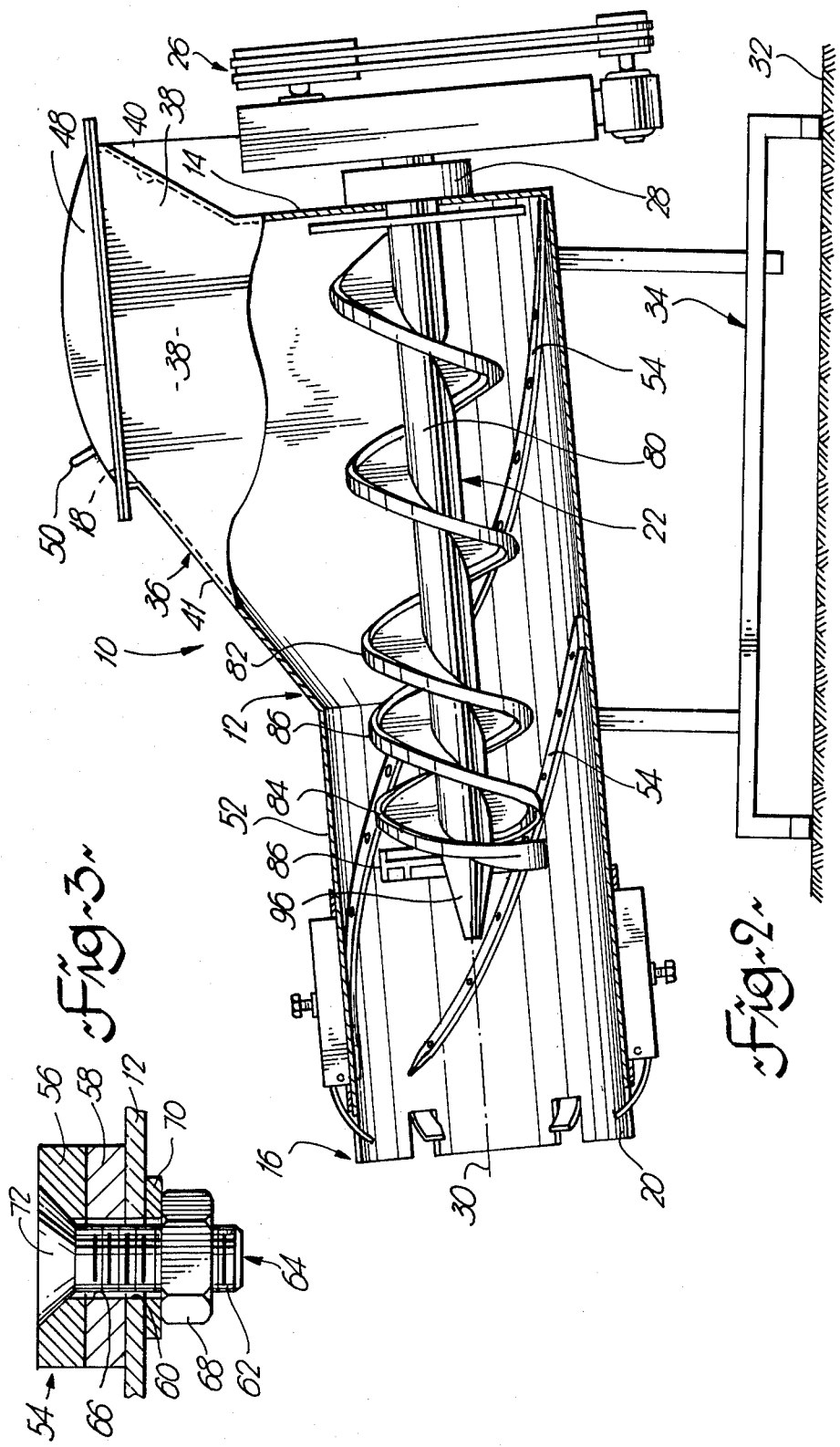

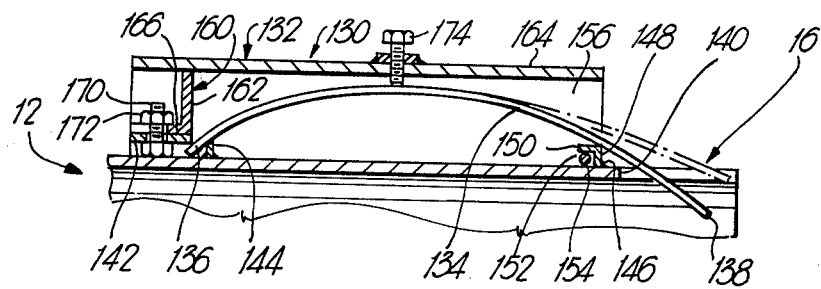
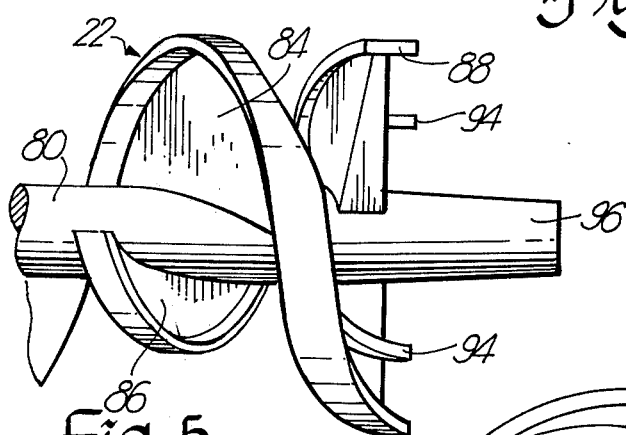
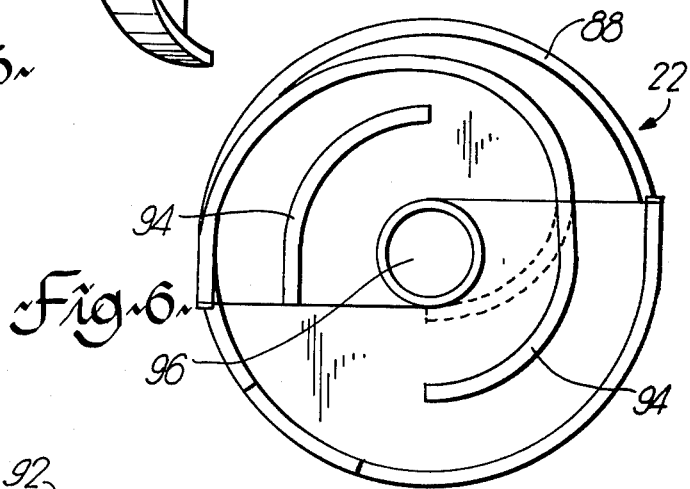
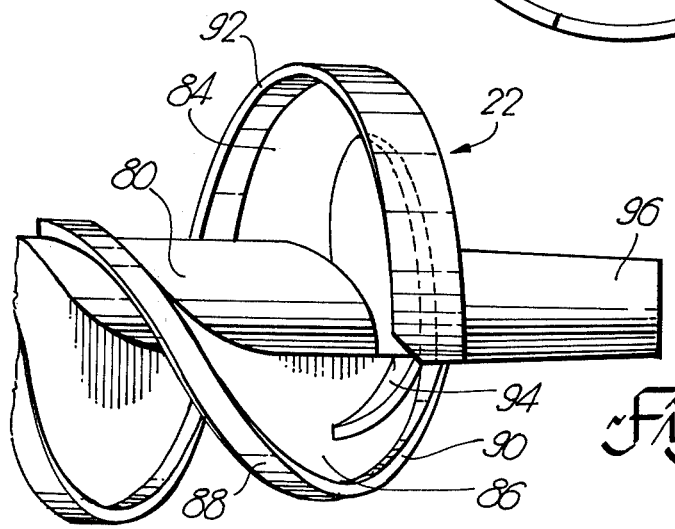

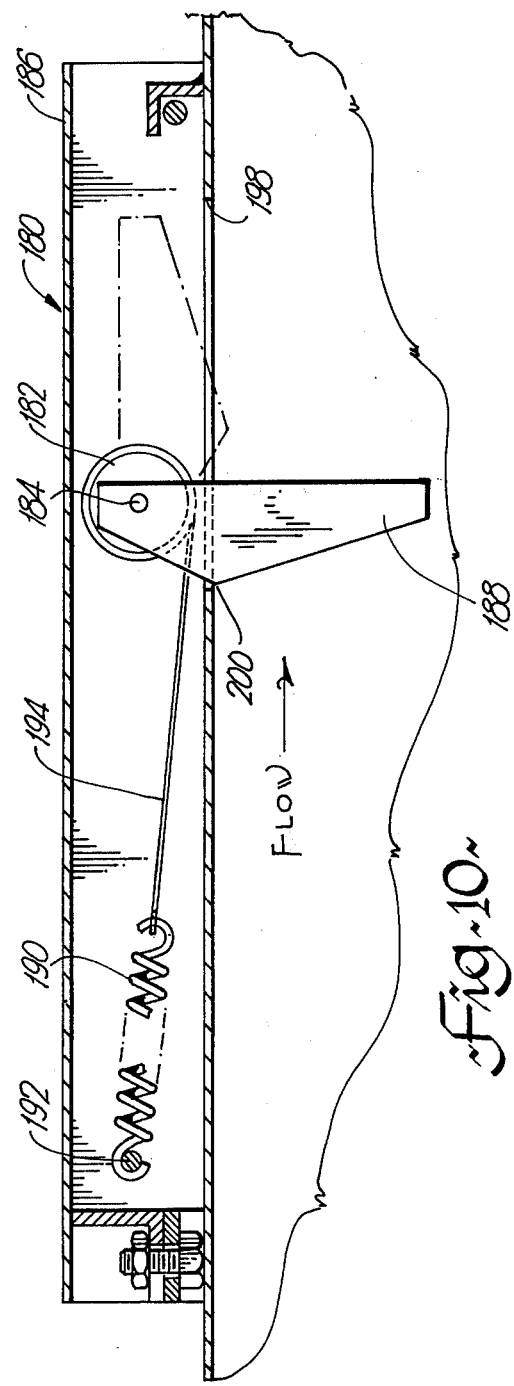

REFUSE COMPACTING DEVICE

This invention relates to a device for compacting refuse.

There are many different methods and apparatus for processing and compacting refuse. One type of compacting apparatus is incorporated into refuse vehicles and generally includes a compacting blade or such structure operated by appropriate hydraulic motors and mechanical linkages. Apart from significantly increasing the cost of the vehicle, such devices are heavy and cumbersome, require regular maintenance and are hazardous to workmen. The best of vehicle mounted refuse compaction apparatus may achieve a volume reduction ratio of about 4:1.

Another type of apparatus is a stationary type of compactor. This type may utilize a hydraulic ram or an auger to produce a densified plug of refuse material. The auger type is generally favoured over the hydraulic ram type because of its simplicity and continuous mode of operation. Known auger refuse compactors are generally provided with a housing having a hopper section into which refuse is fed and a compaction tube in which the refuse is compressed. Conventionally, the section of the auger screw in the hopper cooperates with means in the hopper to shred the refuse before it is advances to a compaction tube portion of the housing.

Once the refuse material has been shredded, in known auger type compaction devices, compaction is achieved in part by the friction and in part by the provision of a resiliently mounted density control latch at the discharge opening of the compaction tube. It is essential that refuse be shredded in advance of the compaction tube otherwise some refuse would not pass between the housing and auger screw in the compaction tube. Conversely, the fact that the auger must cooperate with means in the housing to shred the refuse greatly restricts the size of refuse which can be processed and, additionally, some materials cannot be shredded by the shredding portion or cannot pass between the auger screw and housing and therefore must be separated from the refuse to be disposed. It follows that the shredding portion of the device will be subject to significant wear and, as a result, exotic and expensive materials must be used in these areas to extend the life of the apparatus.

Also characteristics of known auger compactors is that the flow path from the hopper section to the discharge opening is necessarily not continuous in cross-section and therefore presents obstructions to the smooth flow of refuse.

It is therefore the prime object of this invention to improve the performance of auger type refuse compactors. More specifically, this invention provides an apparatus which is simple in construction and operation, economical to manufacture, reliable, capable of compacting refuse which previously could not be compacted and which reduces the stresses to which the various elements are subjected.

The present invention is broadly defined as a refuse compaction device, comprising: a housing having at one end a hopper section for receiving refuse material to be compacted and at the other end a compaction section for compacting refuse into a densified plug; the compaction section communicating with the hopper section for receiving refuse material therefrom and having a refuse material discharge opening; a rotatable auger screw extending through the hopper section and into the compaction section for compacting refuse material therein; and means mounting the auger screw in the housing for limited angular movement in all directions from its normal axis of rotation.

It will become clear in the description which follows that, due to a specific aspect of the invention, the auger periphery may be spaced a substantial distance from the walls of the housing within which it rotates. This considerably reduces the stresses imposed upon the various parts of the unit and increases the types of refuse which can be processed. Furthermore, because the auger is articulated, even larger articles of refuse may be processed. A still further advantage of the present invention resides in the fact that the refuse plug remains dense and integral for longer periods of time and therefore is not readily wind blown at the disposal site.

These and other features of this invention will become apparent from the description which follows in which reference is made to the appended drawings, wherein:

FIG. 1 is a perspective view of the auger-screw compactor;

FIG. 2 is a longitudinal cross-sectional view of the compactor;

FIG. 3 is a cross-sectional view taken through a counter vane;

FIG. 4 is a cross-sectional view taken through a portion of the periphery of the auger flighting;

FIG. 5 is a side view of the end of the auger;

FIG. 6 is an end view of the auger;

FIG. 7 is a top view of the auger shown in FIG. 5;

FIG. 8 is an enlarged cross-sectional view, similar to FIG. 2, showing the auger mounting details; and FIGS. 9 and 10 are cross-sectional views of refuse plug initiating means located adjacent the outlet end of the

DETAIL DESCRIPTION OF THE INVENTION

With reference to FIGS. 1 and 2, it will be seen that the refuse compacting device of this invention, generally designated by reference numeral 10, is comprised of a generally cylindrical housing 12 having a closed end 14 and an open end 16. A refuse intake opening 18 is formed in the periphery of the housing 12 adjacent the closed end 14 and open end 16 constitutes an axial refuse discharge opening 20. An auger screw 22 is mounted for rotation in the closed end wall 14 of housing 12 and extends generally longitudinally into housing 12 beyond intake opening 18 toward but not to discharge opening 20. A power means 26 is mounted upon the external end of auger 22 and serves to rotate the auger. The auger is effective to convey refuse received from the intake opening 18 forwardly toward the discharge opening 20 and to compact or compress the refuse as will become clearer hereinbelow. A mounting means 28 for the auger screw is provided to permit the auger screw to deflect relative to the longitudinal axis of the housing and thereby permit the passage of materials which normally could not be processed by conventional compactors through the housing.

THE HOUSING

The housing 12 is a generally cylindrical structure with its longitudinal axis 30 disposed substantially horizontally, although it may also be disposed vertically. The housing 12 is supported above the supporting surface 32 by means of an appropriate leg structure 34 which may be vertically adjustable.

Adjacent the closed or rearward end 14 of the housing, there is formed a generally vertically extending hopper 36. The hopper 36 includes a pair of vertically extending side walls 38,38, a rearward wall 40 and a sloped front wall 42. The four walls 38,38, 40 and 42 are joined together by welding or bolting and together define intake opening 18 of generally square or rectangular shape. The spacing between the side walls 38,38 is preferably equal to the diameter of the housing but may converge or diverge as desired.

The rearward wall 40 of hopper 36 slopes upwardly and rearwardly from end wall 14 of the housing 12 and is preferably sloped at an angle of about 45° relative to axis 30 of the housing. Side walls 38,38 extend rearwardly of wall 14 to the rearmost portion of wall 40 so as to define an enclosure for the power means 26 as shown in FIG. 2. The slope of wall 40 serves to impart a forward component of motion to refuse fed through the opening 18.

Front wall 42 is preferably formed with a gentle slope of about 30° relative to axis 30 to avoid binding or blockages. When so sloped, the front wall 42, as best illustrated in FIG. 1, is formed with a flat, triangular central portion 44 and opposed curved side portions 46 which mate at the forward ends thereof with the cylindrical portion of housing 12.

The opening 18 of hopper 36 may be closed by a lid 48 which may be removable or hinged as shown. An appropriate handle 50 may be provided to facilitate opening of the lid.

With the exception of that which may be provided by wall 42, very little compaction takes place in the hopper. Compaction takes place in the forward cylindrical portion 52 of housing 12. The manner in which compaction is effected will be described later. As best shown in FIG. 2, the portion 52 provides virtually no obstruction to flow of material thereby significantly reducing the likelihood of blockage. However, means may be provided to initially resist flow of refuse in order to generate the necessary back pressure to form a refuse plug and longitudinal ribs or vanes on the inner surfaces of the housing to avoid any tendency of jamming.

In order to minimize the likelihood that refuse becomes jammed or caught in the auger flighting and rotate with it without advancing, the interior surface of the housing is provided with antijamming ribs or counter vanes 54. The vanes 54 are intended to present an obstruction to refuse moving in a circular path inside the housing but not so to longitudinal movement. The vanes may simply be longitudinally extending bars of steel secured to the interior of the housing. To minimize the stresses imparted to the auger and housing, however, the vanes will preferably take the form illustrated in FIGS. 2 and 3.

As shown in FIGS. 2 and 3, the counter vanes 54 are elongated assemblies secured to the interior of the housing in a helical fashion, the direction of the helices being opposite to that of the auger screw. Three vanes are shown. More or less may be provided.

FIG. 3 illustrates a counter vane in cross-section. As shown each vane is comprised of two elongated strips of steel, one resting atop the other. The upper strip 56 is formed of a high strength material such as carbon steel while the lower strip 58 is formed of a softer, less expensive material such as mild steel. The housing is formed with three helical patterns of holes 60 for receiving the shank portions 62 of plow bolts 64 or the like. The shanks 62 extend through aligned holes 66 in the upper and lower strips 56 and 58 and are secured by nuts 68 to the housing 12. Flat washers 70 may be provided between nuts 68 and the housing.

AUGER

The auger 22 is comprised of a shaft section 80 and two flight sections 82 and 84. Shaft 80 is mounted in a bearing assembly 28 in cantilever fashion as shown in FIG. 2. As will be discussed in greater detail later, the bearing assembly and auger are flexibly or resiliently mounted in end wall 14 of housing 12.

First flight section 82 extends from end wall 14 to the forwardmost end of hopper 36 and the pitch of this section is preferably equal to or greater than the longitudinal dimension intake opening 18 so that any article fed through the opening can be positioned between a pair of flight portions, and not simply rest atop a number of flights, and conveyed forwardly as the auger rotates. The second flight section is located substantially entirely within the compaction portion of the housing. The second flight section is effective to compact the refuse.

The pitch of the second flight section is less than that of the first flight section. This may be achieved by reducing the pitch of the second flight section at a constant rate or, as shown in FIG. 2, by adding an additional flight section 86. It will be seen that an article will move only half of the distance in the second flight section as it did in the first flight. Thus, since the feed rate is greater than the discharge rate, there must be an accummulation of refuse in the cylindrical portion 52 of the housing. This accummulation can only be accommodated if the refuse is compacted. Indeed, the two flight sections 84 and 86 compress the refuse axially and then radially outwardly against the housing. The latter serves to increase the frictional forces between the housing and refuse and thereby increases the amount of accummulation (or compaction) in housing portion 52. When the refuse cannot be further compacted, it is forced to move outwardly of the discharge opening as a densified plug.

To further assist in compacting the refuse, the outer helical edges of the flights are provided or faced with a strip 88 of hardened steel to define a T-shaped cross-section as shown in FIG. 4. Strip 88 defines a rib 90 projecting forwardly and a rib 92 projecting rearwardly of the housing. As the auger rotates, the ribs 90 and 92 serve to concentrate compressing loads located at areas on the refuse and thereby plastically deform or destroy the "memory" of the refuse material, but do not necessarily shear, the material of which the refuse is made. Thus, the strength of the article being processed is decreased as it is conveyed forwardly, but since the material is not sheared, the integrity of the refuse plug being formed is increased so that when it is discharged, the plug will tend to remain intact or integral longer than the plugs produced by conventional compactors.

FIGS. 5, 6 and 7 illustrate the forward end of the auger in greater detail. It will be seen that the terminal portions of flights 84 and 86 are each provided with a forwardly projecting rib 94 approximately midway between shaft 80 and strip 88. These ribs serve the same purpose as strip 88 and that is to concentrate the compressive loads at a localized area on the refuse material to thereby plastically deform the same.

As best shown in FIG. 6, the flight sections 84 and 86 terminate in a plane which is substantially tangent to the outer diameter of the flight sections 22. As also shown in FIGS. 6 and 7, flight section 86 is introduced gently, at an angle of about 10°, to the shaft circumference so as to minimize the likelihood of blockage or jamming. Similarly, the initial portion of ribs 94 is gentle.

Shaft portion 80 of the auger extends beyond the terminal portions of flight sections 84 and 86 to define an extension or projection 96. The extension 96 serves to form a bearing in the refuse for supporting the free end of the cantilever auger. The extension may be cylindrical but a slightly frusto-conical shape is preferred.

AUGER MOUNTING MEANS

As mentioned earlier, the auger is mounted in such a manner that it is capable of angularly deflecting omnidirectionally with respect to the axis of the housing upon application of a predetermined radial force upon the auger. Such deflection not only serves to reduce the stresses imposed upon the auger, but also serves to permit the passage of refuse which otherwise could not be processed. A method of mounting the auger will now be described with reference to FIG. 8.

As shown in FIG. 8, shaft 80 of auger 22 is mounted for rotation in a bearing assembly 100 which may form part of or be separate from a speed reduction unit 102 which drives shaft 80. A plate or flange 104 is secured to the bearing assembly 100 by a plurality of equally angularly spaced bolts 106. The plate 104 is preferably formed with countersunk holes 108 to receive the bolt head 110 of the bolts. The bearing assembly 100 and shaft 80 extend through an opening 112 of end wall 24 of the housing 12. While plate 104 may be located externally of the housing, it is preferably located internally as shown.

The plate 104 and end wall 24 of the housing are formed with a circular pattern of a plurality of equally, angularly spaced holes 114 and 116, respectively, to receive a plurality of tension bolts 118. The holes 114 are preferably countersunk to receive the heads 120 of bolts 118. The bolts 118 extend outwardly of the housing and receive spring retainers 122 formed with shoulders 124 to adjustably retain springs 126 against the external surface of wall 24.

Thus, it will be seen that if a radial load is applied to shaft 80, a number of springs 126 will be compressed and the shaft 80, bearing assembly 100, speed reducing unit 102 and plate 104 will tend to pivot about a point on the outer circumferential edge 128 of plate 104. Springs 126 may be preloaded by adjusting the spring retainers 122 inwardly or outwardly and, accordingly, the force required to deflect the shaft may be controlled.

It will be understood that the above mechanism may be modified and/or that other schemes may be devised for flexibly mounting the shaft.

REFUSE PLUG INITIATING MEANS

As indicated earlier, it may be desirable to provide means at the outlet end of the housing to ensure that sufficient back pressure is generated to initiate a compact refuse plug. Two alternative embodiments of such means are illustrated in FIGS. 9 and 10.

One plug initiating means is generally designated by reference numeral 130 in FIG. 9. A plurality of such units are equally, angularly spaced about the periphery of the outlet 16 as shown in FIG. 1.

Each unit 130 is generally comprised of an elongated U-shaped cover member 132 which extends longitudinally of and is secured to housing 12. An arcuate leaf spring 134 has one end 136 constrained within the cover member and the other end 138 extending outwardly of the forward end of the cover, through a notch 140 of housing 12, and into the interior of the housing. End 136 is constrained within the cover between an inverted U-shaped weldment 142 and a shoulder 144 both of which are welded or otherwise secured to the housing.

Spaced from the shoulder 144 is a transversely extending angle member 146 which has one leg portion 148 secured to housing 12 by welding and the other leg portion 150 is directed rearwardly and spaced from the exterior surface of housing 12 to define an opening 152. Opening 152 is adapted to receive the shank portion of a bolt 154 extending between the forward ends of arms 156 and 158 of the U-shaped cover member.

The other end of the cover member is provided with an angle member 160 which has one leg 162 secured to the wall 164 adjoining arms 156 and 158 and the other leg 166, spaced from wall 164, and extending rearwardly. Leg 166 is formed with a rearwardly extending notch 168 which receives a threaded bolt 170 extending from weldment 142. Bolt 170 threadedly receives a nut 172. Thus, it will be seen that the cover member is readily removably attached to housing 12. The secure it to the housing, bolt 154 is positioned between arm 150 and housing 12, and the cover is pivoted thereabout in a counterclockwise direction as viewed in FIG. 9 until leg 166 engages weldment 142. Nut 172 may then be threaded onto bolt 170.

The extent to which end 138 of spring 134 extends into housing 12 may be adjusted by means of a bolt 174 which is threadedly received in a nut 176 welded to wall 164 of cover member 132. The inner end of bolt 174 bears the convex surface of spring 134 and by threading the bolt inwardly or outwardly, the curvature of the spring is varied.

It will be seen that before a refuse plug of the desired density is produced, the ends 138 of the springs 134 will extend into the housing 12 as shown in solid lines in FIG. 9 and resist outward movement of the refuse. However, as the refuse accummulates and its density increases within the compaction portion of the housing, the ends 138 will be forced toward the periphery of the housing but by virtue of their resilience but will continue to apply an inwardly directed force to maintain the plug at the desired density without significantly obstructing movement of the plug.

Another plug initiating means 180 is illustrated in FIG. 10. This embodiment is similar in principle to the embodiment of FIG. 9 except that in place of arcuate leaf springs, tension springs and elongated control arms mounted on pulleys are utilized.

Thus, as illustrated in FIG. 10, each unit 180 includes a pulley 182 rotatably mounted on an axle 184 mounted in appropriate bearings (not shown) in the spaced arms of the protective cover 186. Cover 186 may be identical to cover 132 of the previous embodiment and therefore the description thereof need not be duplicated. Positioned on either side of the pulley 182 and secured thereto are elongated flow control arms 188 which are biased toward a radially inwardly extending position by means of helical tension spring 190. Spring 190 has one end connected to a bolt 192 secured to the cover 186 and the other end connected to one end of a cable 194. The other end of the cable is attached to the circumference of the pulley in any suitable manner. It will be understood that suitable means may be provided to preload spring 190.

As will be seen, as the density of refuse plug increases and the plug begins to move outwardly, the control arms will rotate from their initial radial position to a generally longitudinal position shown in dotted lines through slots 198 in housing 12. To ensure that an adequate load is maintained on the plug, arms 188 are each provided with an elbow 200 which will normally remain within the housing when the arm is in its longitudinal position although it may be forced flush with the slot if the density of the plug is sufficiently great.

Thus, it will be such that the present invention provides a refuse compacting device which is simple in construction and operation, virtually maintenance free and reliable. Depending upon its application it may also be readily transportable. The present device is readily adaptable in terms of capacity to various applications such as use by individual restauranteurs to large refuse collecting transfer stations wherein conventional refuse vehicles deliver either compacted or non-compacted refuse for further compaction and delivery to high capacity refuse vehicles for transport to an ultimate disposal site.

It will further be understood that the motor means may be of any desirable type such as a gas engine, electric motor or power take off.

It will be still further understood that the preferred form of the invention utilizes an articulated auger, a rigid auger may be provided inasmuch as such an embodiment may still be superior to conventional auger type refuse compactors.

Further modification and changes may be made without departing the claims appended hereto.

The embodiments of the invention in which an exclusive property or privilege is claimed are defined as follows:

1. A refuse compaction device, comprising:
   a housing having at one end a hopper section for receiving refuse material to be compacted and at the other end a compaction section for compacting refuse into a densified plug;
   said compaction section communicating with said hopper section for receiving refuse material therefrom and having a refuse material discharge opening;
   a rotatable auger screw extending through said hopper section and at least partly into said compaction section for compacting refuse material therein, said auger screw being mounted in cantilever fashion in an end wall of said hopper remote from said compaction section;
   means mounting said auger screw in said housing for limited angular movement in all directions from its normal axis of rotation;
   said auger screw being adapted to be drivingly connected to power means for rotatably driving said auger screw.

2. A refuse compaction device as defined in claim 1, said housing having adjacent said refuse discharge opening at least one density control arm for initiating a densified plug of refuse material, each said control being movable from a first position wherein it presents an obstruction to flow of refuse material to a second position wherein it presents minimal obstruction to flow of refuse material.

3. A refuse compaction device as defined in claim 1, said mounting means comprising:
   a bearing assembly rotatably carried at one end of said auger screw;
   flange means secured to said bearing assembly and extending radially outwardly relative to said auger screw;
   means biasing said flange means against said end wall of said hopper section;
   whereby upon application of a radial force of a predetermined magnitude on said auger screw, said biasing means will permit said flange means to angularly separate from said end wall to permit said auger screw to angularly deflect from its normal axis of rotation.

4. A refuse compaction device as defined in claim 3, said flange means being an annular plate removably secured to one end of said bearing assembly.

5. A refuse compaction device as defined in claim 4, said biasing means including a plurality of pin means connected at one end of said flange means, and extending through said end wall;
   shoulder means at the other end of each said pin means; and,
   a helical coil spring on said pin means between each said shoulder means and the side of said end wall remote from said flange means.

6. A refuse compaction device as defined in claim 5, said shoulder means being adjustable to permit presetting of said springs to predetermine the force required to displace said flange means from said end wall and said auger screw from its normal axis of rotation.

7. A refuse compaction device as defined in claim 1, said auger screw having a first flight section extending throughout the length of said hopper section and a second flight section extending from said first flight section to the end of said auger screw remote from said mounting means.

8. A refuse compaction device as defined in claim 7, wherein the pitch of said second flight section is less than that of said first flight section.

9. A refuse compaction device as defined in claim 7, wherein the pitch of said second flight section is one-half that of said first flight section.

10. A refuse compaction device as defined in claim 7, 8 or 9, wherein said second flight section is continuous with said first flight section.

11. A refuse compaction device as defined in claim 7, said second flight section having an additional flight section at the end of said auger screw remote from said mounting means.

12. A refuse compaction device as defined in claim 11, wherein the outer edge of each said flight section is faced with a continuous strip of material which defines forwardly and rearwardly projecting ribs which serve to plastically deform the refuse material.

13. A refuse compaction device as defined in claim 12, wherein said second and additional flight sections each include a generally forwardly projecting rib at their forward end thereof generally midway between said strip of material and the auger screw shank.

14. A refuse compaction device as defined in claim 13, wherein said auger shank includes a portion projecting forwardly of the forwardmost terminal portion of said flight sections.

15. A refuse compaction device as defined in claim 14,
wherein said projecting portion is tapered.

16. A refuse compaction device as defined in claim 1,
wherein said housing is an elongated cylindrical unit, said compaction section being the forward end of said unit and said hopper section being the rearward end of said section.

17. A refuse compaction device as defined in claim 16,
said hopper section including a rearwardly inclined front and rear wall members and a removable cover for closing a horizontally disposed intake opening.

18. A refuse compaction device as defined in claim 17,
wherein said inclined rear wall intersects the normal axis of rotation of said auger at an angle of about 45°.

19. A refuse compaction device as defined in claim 17,
wherein said inclined front wall intersects the normal axis of rotation of said auger screw at an angle of about 30°.

20. A refuse compaction device as defined in claim 16,
wherein at least one antijamming rib is provided in the interior of said housing.

21. A refuse compaction device as defined in claim 20,
wherein each antijamming rib is comprised of first and second strips of metal, said first strip being of relatively soft metal and said second strip overlying said first strip and being of relatively hard metal.

22. A refuse compaction device as defined in claim 21,
wherein each said rib extends longitudinally of said housing.

23. A refuse compaction device as defined in claim 21,
wherein each said rib is generally helical, the direction of the helicis being opposite to the flights of said auger screw.

24. A refuse compaction device as defined in claim 22 or 23,
further including fastening means for removably securing said ribs to the interior of said housing.

25. A refuse compaction device as defined in claim 16,
wherein said compaction section is comprised of a pair of semi-cylindrical halves and having hinge means interconnecting one pair of adjacent edges of said halves and releasable securing means for releasably securing the other pair of adjacent edges.

26. A refuse compaction device as defined in claim 2,
wherein each said density control arm is movable from said first position toward said second position in response to the pressure of a densified plug of refuse material and spring means serving to bias each said arm toward said first position.

27. A refuse compaction device as defined in claim 26,
wherein each said control arm includes a knuckle portion which extends a sufficient distance inwardly of said housing when said arm is in said second position so as to maintain a predetermined load on said densified plug.

28. A refuse compaction device as defined in claim 2,
said housing having three control arms, movable inwardly and outwardly of the housing wall through longitudinal slots formed in said walls,
each said arm comprising:
a pair of parallel arm members interconnected by a pulley mounted for rotation externally on said housing adjacent said slots;
a knuckle intermediate its ends adaptable to project inwardly of said housing a slight distance when said arm is in said second position so as to maintain a predetermined load on said plug; and,
coil spring means located externally of said housing and having one end secured to said housing and the other end secured to said pulley for biasing said control arm toward said first position.

29. A refuse compaction device as defined in claim 28,
further including shield means enclosing each said control arm and associated coil spring.

30. A refuse compaction device as defined in claim 1, 16 or 28,
said auger screw being formed so as to provide a substantial clearance between the outer diameter of said auger screw and the internal surface of said housing.

31. A refuse compaction device comprising:
an elongated generally cylindrical housing having a wall at one end defining a closed rearward end and an open forward end;
a gravity feed hopper section at said rearward end having a refuse intake opening and a compaction section at said forward end, said compaction section communicating with said hopper section for receiving refuse material therefrom, said open forward end of said housing defining a refuse material discharge opening;
an auger screw mounted in cantilever fashion in said wall and extending axially through said hopper section from said wall and into said compaction section, said auger screw being effective to convey refuse material received in said hopper to said compaction section and compact the refuse material therein;
power means;
said auger screw being secured to and rotatably driven by said power means; and,
means mounting said auger screw in said wall for rotation about a normal axis concentric with the axis of said housing and for resilient angular displacement in all directions from said normal axis upon application of a predetermined normal force to said auger screw.

32. A refuse compaction device as defined in claim 31,
wherein said power means includes motor means and gear reduction means located externally of said housing.

33. A refuse compaction device as defined in claim 31,
said auger screw being rotatably rigidly connected to an annular flange, means for resiliently biasing said flange against the inner side of said wall.

34. A refuse compaction device comprising:
an elongated generally cylindrical housing having a wall at one end defining a closed rearward end and an open forward end defining a refuse material discharge opening;

means for supporting said housing on a support surface;

said housing further having a gravity feed hopper section at said rearward end having a generally rectangular refuse material intake opening defined by a pair of flat side walls, a upwardly and rearwardly inclined rear wall and a rearwardly, and upwardly inclined front wall and a compaction section communicating with said hopper section for receiving refuse therefrom;

a rotatable auger screw adapted to extend axially through said hopper section and partly into said compaction section and being effective to convey refuse material from said hopper to said compaction section and compact refuse material in said compaction section, said auger screw having a shank portion and first and second flight sections formed on said shank portion, said first portion in and extending throughout said hopper section and having a pitch substantially equal to the longitudinal dimension of said intake opening, said second flight portion being continuous with said first flight portion and having a pitch which is less than that of said first portion, said shank portion having an extension which projects forwardly of the forwardmost end of said second flight section;

a power means;

said auger screw being secured to and rotatably driven by said power means;

means for mounting said auger screw and power means in cantilever fashion in said wall for rotation about a normal axis of rotation concentric with the axis of said housing and permitting resilient angular displacement of said auger screw and power means from said normal axis of rotation to permit passage of refuse material between said housing and auger screw; and, means for maintaining a substantially constant force upon a densified plug of refuse material produced in said compaction section.

35. A device as defined in claim 1, 31 or 34, further including means located at the outlet end of said housing for generating sufficient back pressure to initiate a refuse plug, said means comprising at least one arcuate leaf spring extending longitudinally of said housing adjacent said outlet end, one end of said spring being pivotally connected to said housing and the other end extending inwardly into said housing.

* * * * *